United States Patent [19]

Biddle

[11] Patent Number: 4,605,122
[45] Date of Patent: Aug. 12, 1986

[54] SCRAPER CHAIN CONVEYOR
[75] Inventor: Ronald A. Biddle, St. John's, England
[73] Assignee: Dowty Meco Limited, Worcester, England
[21] Appl. No.: 668,756
[22] Filed: Nov. 6, 1984
[30] Foreign Application Priority Data
Nov. 22, 1983 [GB] United Kingdom ............... 8331129
Mar. 16, 1984 [GB] United Kingdom ............... 8406979
[51] Int. Cl.⁴ .............................................. B65G 23/06
[52] U.S. Cl. ................................. 198/834; 74/661; 74/411.5
[58] Field of Search ............... 198/834, 835, 854, 813; 74/661, 411.5

[56] References Cited
U.S. PATENT DOCUMENTS

| | | | |
|---|---|---|---|
| 2,810,565 | 10/1957 | Dommann | 74/661 |
| 3,855,871 | 12/1974 | Gibson et al. | 74/661 |
| 3,863,522 | 2/1975 | Gibson et al. | 74/661 |
| 4,043,213 | 8/1977 | Gibson | 74/661 |
| 4,125,178 | 11/1978 | Monks | 74/661 X |
| 4,160,391 | 7/1979 | Monks | 74/661 |

Primary Examiner—Joseph E. Valenza
Assistant Examiner—Michael Stone
Attorney, Agent, or Firm—Hayes, Davis & Soloway

[57] ABSTRACT

A conveyor-chain-drive gear-box and a chain-tensioning assembly comprising main gearing in the gear-box which includes a shaft carrying one of the gears, and auxiliary gearing outside the gear-box adapted to be driven by an auxiliary motor and having a gear wheel. An apertured side wall affords means through which the gear wheel and shaft may be removably connected together. An idler gear outside the gear-box is movable from a position in which it is out of engagement with the auxiliary gearing to an operative position in which it can transmit drive from the auxiliary motor to the auxiliary gearing. A housing is provided which is removably mounted on the side wall and within which are housed the auxiliary gearing and the idler gear.

8 Claims, 8 Drawing Figures

Fig.1

SCRAPER CHAIN CONVEYOR

This invention relates to scraper chain conveyors and, more particularly, to devices for assisting the adjustment of the tension of the chain.

In the specification of U.K. Pat. No. 1 221 638 there is described such a device, for a scraper-chain conveyor, which is capable of being secured to the side wall of the gear-box containing the gearing by which the conveyor is driven.

The device includes a hydraulic motor and a reduction gear which includes a self-locking worm and worm wheel. The worm wheel is arranged on a shaft which is displaceable to render the device operable. When so displaced a clutch member on the shaft engages with another clutch member on a shaft connected to a bevel gear in the gear-box.

The purpose of the self-locking worm and worm wheel is to prevent rotation of the conveyor in a reverse direction.

An object of this invention is to provide an improved conveyor-chain-drive gear-box and an auxiliary drive unit to assist the adjustment of the chain, which unit can readily be attached to and removed from the gear-box.

A conveyor-chain-drive gear-box and an auxiliary drive unit therefor, the gear-box comprising:
an input shaft;
an output shaft;
a side wall having an aperture therein;
a further shaft extending through said aperture and having an end portion outside the gear-box;
a bevel wheel carried by the further shaft within the gear-box;
a bevel pinion carried on the input shaft for meshing engagement with the bevel wheel to provide a driving connection therebetween;
an auxiliary drive unit having a housing detachably secured to said side wall; the auxiliary drive unit further including:
a drive pinion removably secured to the end portion of the further shaft;
an auxiliary hydraulic motor supported by the housing;
a driving pinion connected to the auxiliary motor;
an idler gear rotatably supported by the housing by means of a splined shaft and continuously in mesh with the driving pinion;
a number of dogs carried on a side surface of the idler gear;
a number of non-rotatable dogs carried by the inside wall of the housing in such a manner as to allow sliding movement with respect thereto.

The accompanying drawings show one embodiment, which is given by way of example of the invention, of a conveyor-chain-drive gear-box and a auxiliary drive unit assembly.

In those drawings

Referring to the drawings, the conveyor-chain-drive gear-box 1 has an input shaft 2 and an output shaft 3. The input shaft 2 is driven by a fluid coupling 4 which, in turn, is driven by a main motor 5. The output shaft 3 drives the chain sprocket assembly (not shown) of a scraper-chain conveyor.

Within the gear-box 1 the input shaft 2 carries a bevel pinion (not shown) which meshes with a bevel wheel 6 carried by a further shaft 7. The further shaft 7 runs at right angles to the longitudinal axis of the gear-box 1 and has an end portion 8 passing through and extending beyond an opening in the side wall of the gear-box 1.

When the conveyor-chain-drive gear-box is not used with an auxiliary drive unit, the end portion 8 of the further shaft 7 may be covered by an appropriately-shaped housing secured to the side-wall of the gear-box.

The auxiliary drive unit is in the form of a detachable auxiliary gear-box secured to a side wall of the main gear-box 1. The auxiliary gear-box comprises a housing 9 and a cover plate 10. It includes a driven pinion 11 secured to the end portion 8 of the further shaft 7, an idler gear 12 mounted on a splined shaft 13, and a driving pinion 14 which is connected to a low-speed hydraulic motor 15, an auxiliary motor.

Figure 1:
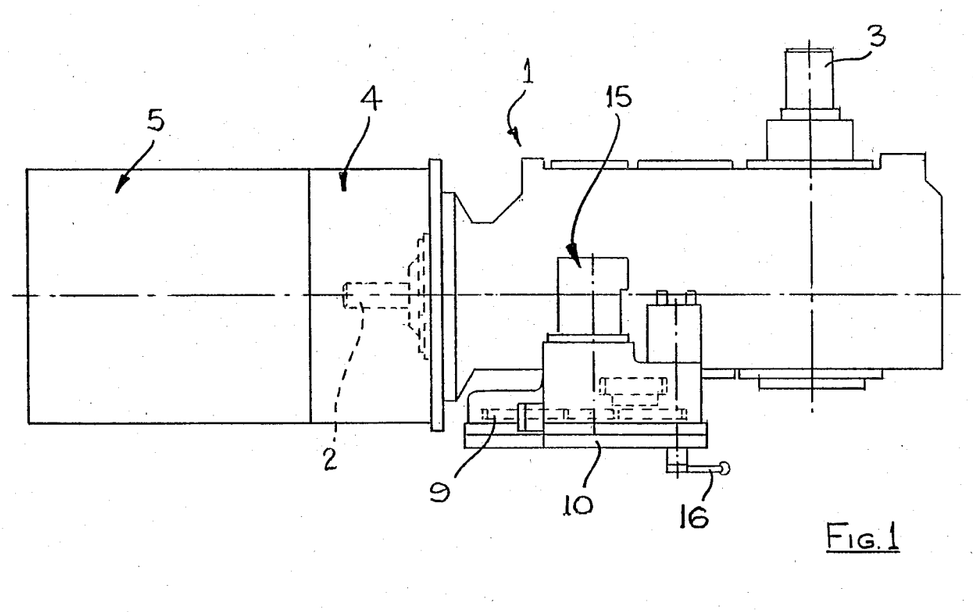
FIG. 1 is a plan view of the conveyor-chain-drive gear-box and auxiliary drive unit, together with a motor and a fluid coupling.
Figure 2:
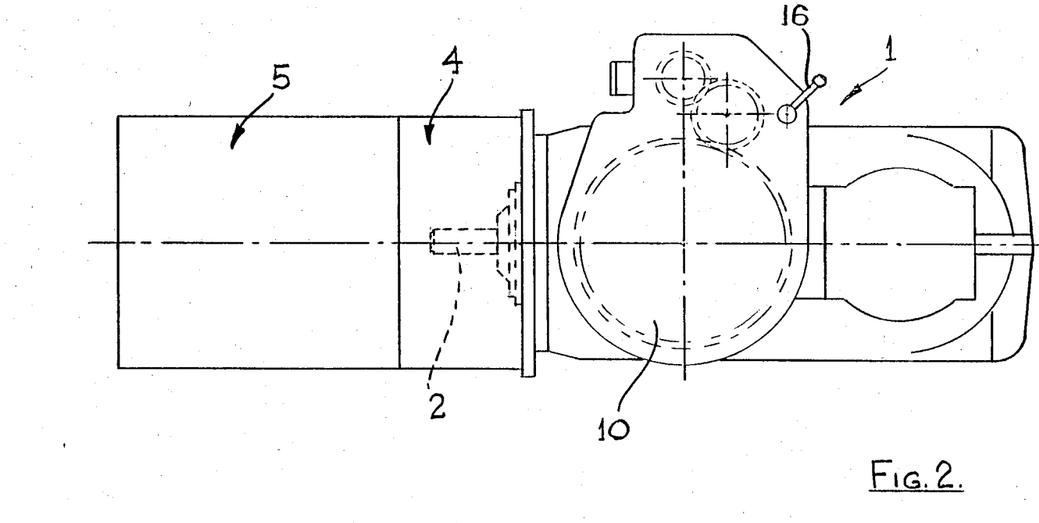
FIG. 2 is an elevational view of the conveyor-chain-drive gear-box and auxiliary drive unit, together with the motor and the fluid coupling.
Figure 3:
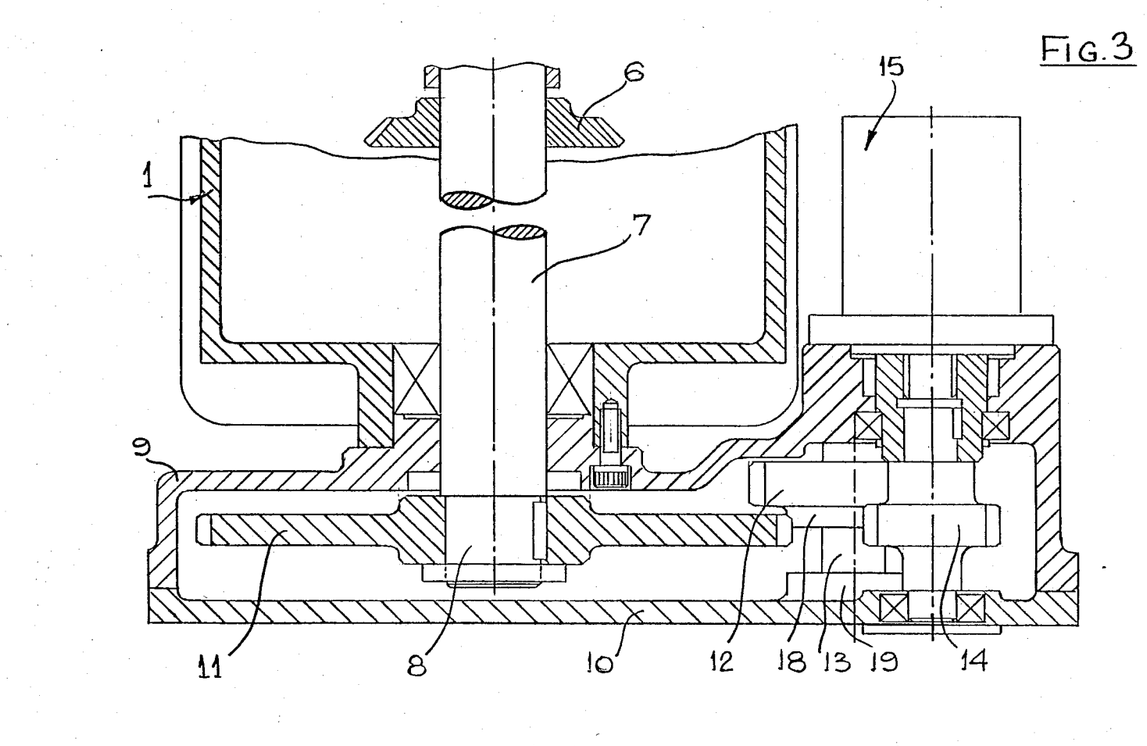
FIG. 3 is a sectional view of the auxiliary drive unit.
Figure 4:
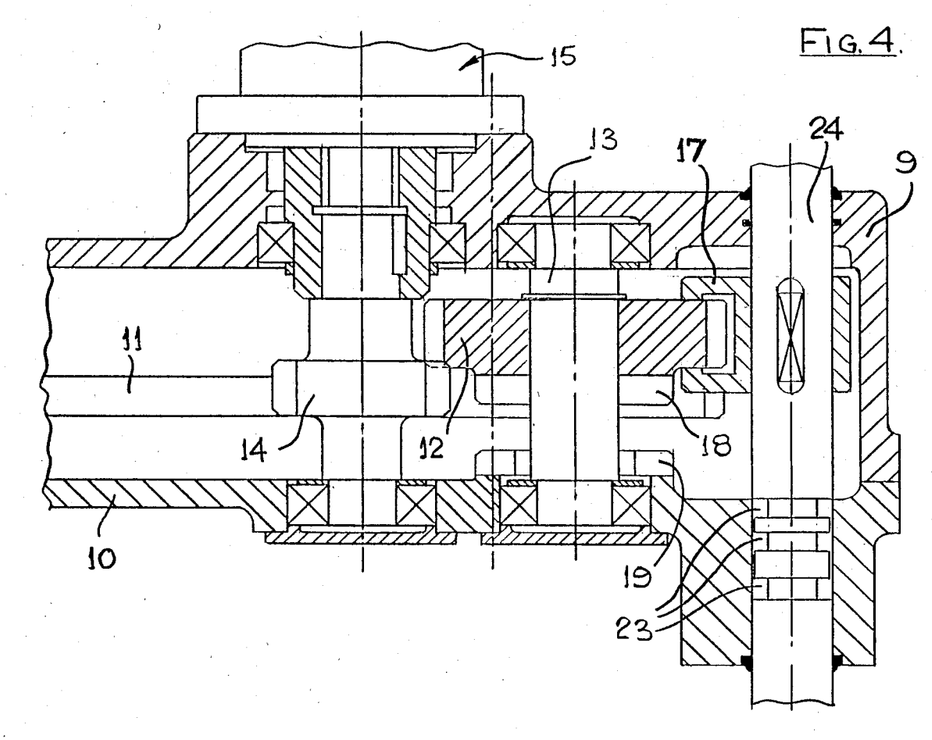
FIG. 4 is a sectional view of part of the auxiliary drive unit.
Figure 5:
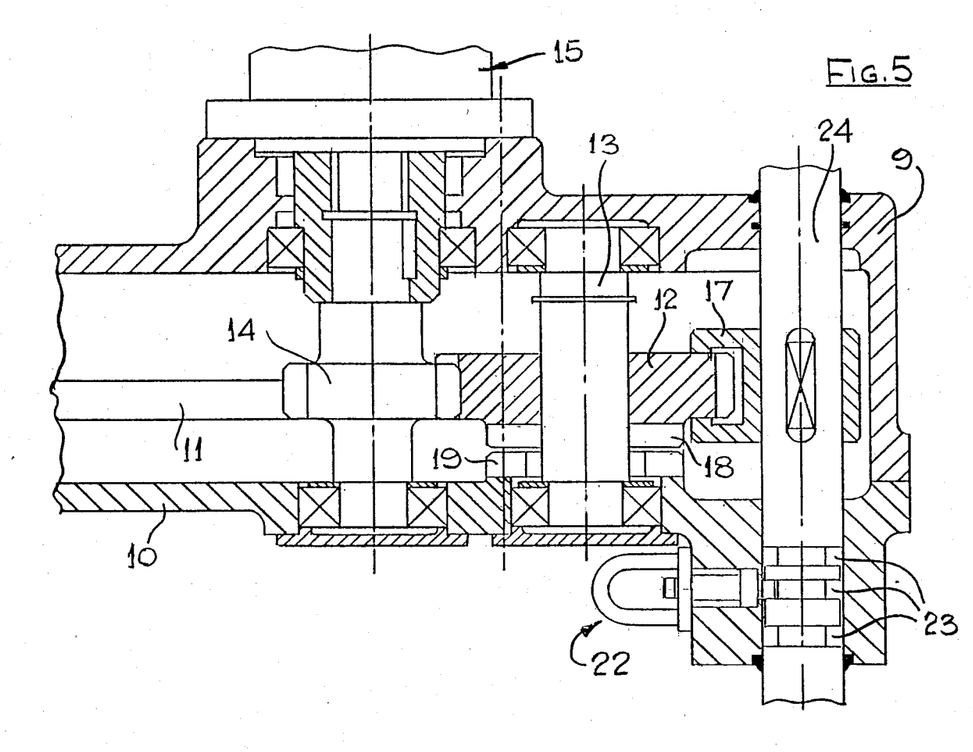
FIG. 5 is another sectional view of that part of the auxiliary drive unit.

The idler gear 12 is always in mesh with the driving pinion 14 and, by means of an operating handle 16 (see FIG. 1) and a fork 17 (see FIGS. 4, 5 and 6) can be moved from the position shown in FIG. 4 to the position shown in FIG. 5, in which position it meshes with driven pinion 11. It can be further moved by the operating handle 16 from the position shown in FIG. 5 to the position shown in FIG. 6, in which position the idler gear 12 meshes with driven pinion 11, and dogs 18, carried on its side surface, engage with dogs 19 on part of the cover plate 10.

The operating handle 16 is, in known manner, associated with the main motor 5 so that as the idler gear 12 is being moved to, and while it is in, the position shown in FIG. 5, the main motor 5 cannot be run.

Figure 6:
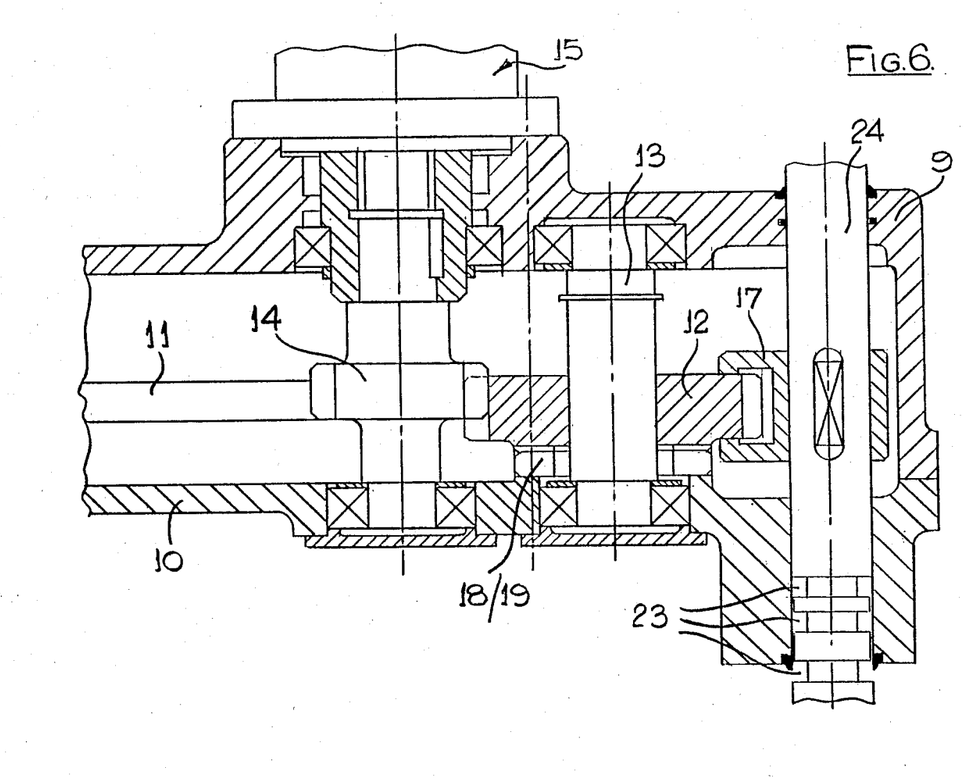
FIG. 6 is a third sectional view of that part of the auxiliary drive unit.

When the operating handle 16 has moved the idler gear 12 from the position shown in FIG. 5 to the position shown in FIG. 6 the main motor 5 can be run.

During use, if it is necessary to tension the chain of a conveyor, the operating handle 16 will be moved to cause the main motor 5 to be switched off and to cause the idler gear 12 to move from the position shown in FIG. 4 to the position shown in FIG. 5. The hydraulic motor 15 may now be used to drive a chain sprocket assembly connected to the output shaft 3 through the gear-box at a speed which is much lower that that at which the chain sprocket assembly is driven by the main motor 5.

If it is desirable to perform test on the fluid coupling, the idler gear 12 will be moved from the position shown in FIG. 5 to the position shown in FIG. 6. The motor 5 can now be run but, as a consequence of the engagement of the dogs 18 and the dogs 19, both the gearing in the chain-tensioning assembly and the gearing in the gear-box cannot be driven.

Figure 7:
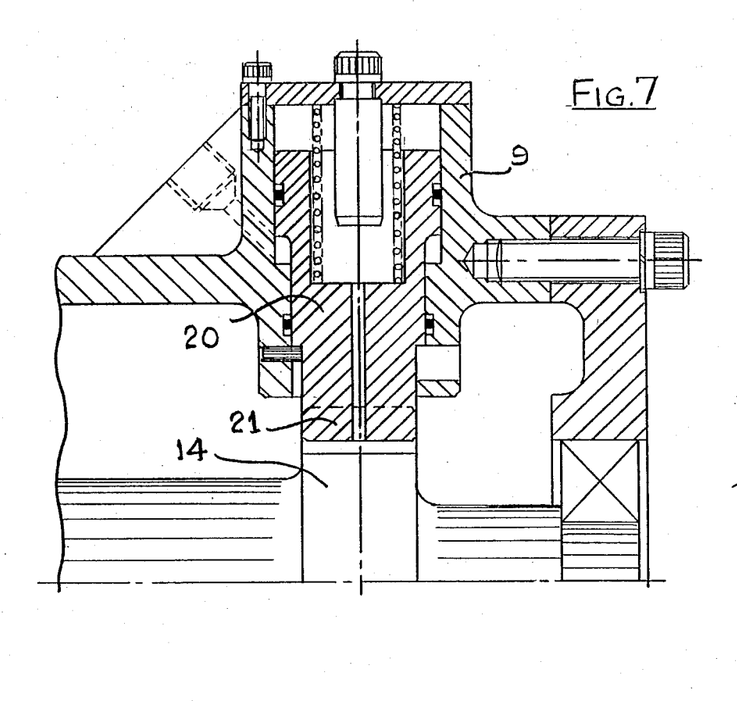
FIG. 7 is a scrap view of a hydraulic safety lock plunger and part of the auxiliary drive unit.
Figure 8:
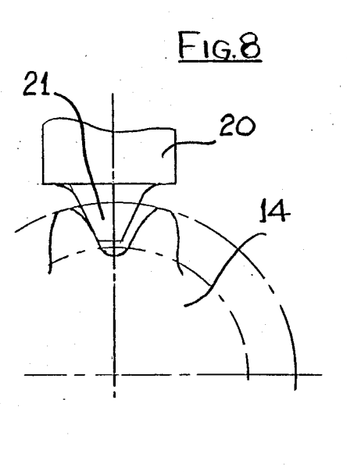
FIG. 8 is another scrap view of the hydraulic safety lock plunger and part of the auxiliary drive unit.

It may also be desirable to provide a locking device which prevents release of tension and consequent movement of the chain sprocket assembly should the supply of fluid to the hydraulic motor 15 fail when the idler gear is in the position shown in FIG. 5. To that end (see particularly FIGS. 7 and 8) a spring-loaded plunger 20 is slidably-mounted in bores of the housing 9. The end portion 21 of the plunger 20 is so formed that it can engage between two adjacent teeth of the driving pinion 14. Normally the plunger is held away from the adjacent teeth by the pressure of the fluid fed to the hydraulic motor. Should that pressure fail, the spring-loaded plunger is moved into engagement with the teeth of the driving pinion 14. This prevents any rotational motion of the driving pinion 14 and, hence, of the chain sprocket assembly.

A manually-operated detent arrangement 22, shown only in FIG. 5 and engageable in grooves 23 in a fork-carrying shaft 24, can be employed to hold the idler gear 12 in the position shown in FIG. 4, the position shown in FIG. 5 or the position shown in FIG. 6.

Our invention thus provides a conveyor-chain-drive gear-box and a chain-tensioning assembly comprising an input shaft to the gear-box which, in use, will be driven by a main motor and a fluid coupling, an output shaft from the gear-box which, in use, will drive a chain associated with a conveyor, gearing in the gear-box including a shaft extending at right angles to the longitudinal axis of the gear-box with one end portion carrying one of the gears of the gear-box gearing and the other end portion passing through, and extending outwardly beyond, an opening in a side wall of the gear-box, a first pinion removably mounted on the end portion of the shaft beyond the opening, a second pinion, an auxiliary motor for driving the second pinion, an idler gear movable from an inoperative position to an operative position in which it can transmit drive from the second pinion to the first pinion, and a removable housing mounted on the side wall of the gear-box within which are housed the end portion of the shaft extending beyond the opening, the second pinion, the first pinion and the idler gear.

The auxiliary motor may be mounted on the external wall of the housing.

The idler gear may be movable into another operative position in which it engages with both the second pinion and non-rotatable abutments on the inside wall of the housing.

Alternatively non-rotatable dogs may be carried by the inside wall of the housing and may be slidable into engagement with the idler gear when it is in its first-mentioned operative position.

I claim:

1. A conveyor-chain-drive gear box and an auxiliary drive unit therefor, the gear-box comprising:
   an input shaft;
   an output shaft;
   a side wall having an aperture therein;
   a further shaft extending through said aperture and having an end portion outside the gear-box;
   a bevel wheel carried by the further shaft within the gear-box;
   an auxiliary drive unit having a housing detachably secured to said side wall; the auxiliary drive unit further including:
   a drive pinion removably secured to the end portion of the further shaft;
   an auxiliary hydraulic motor supported by the housing;
   a driving pinion connected to the auxiliary motor;
   an idler gear rotatably supported by the housing by means of a splined shaft and continuously in mesh with the driving pinion;
   the arrangement being such that the idler gear is movable from a position in which it is out of meshing engagement with the driven pinion to an operative position in which it is in meshing engagement with the driven pinion and that the idler gear is further movable into a position in which it is locked against rotation by engagement with part of the housing while remaining in meshing engagement with both the driving pinion and the driven pinion.

2. A conveyor-chain-drive gear-box and an auxiliary drive unit as claimed in claim 1 in which there are dogs formed on one face of the idler gear for engagement with part of the housing.

3. A conveyor-chain-drive gear-box and an auxiliary drive unit as claimed in claim 2 in which the part of the housing has dogs formed thereon for cooperation with the dogs on the idler gear.

4. A conveyor-chain-drive gear-box and an auxiliary drive unit as claimed in claim 1 in which there is provided a pressure sensitive locking device to lock the driving pinion against rotation in the event of a pressure failure to the hydraulic motor.

5. A conveyor-chain-drive gear-box and an auxiliary drive unit as claimed in claim 4 in which the pressure sensitive locking device comprises a spring-loaded plunger held out of engagement with the driving pinion by fluid pressure.

6. A conveyor-chain-drive gear-box and an auxiliary drive unit therefor, the gear-box comprising:
   an input shaft;
   an outut shaft;
   a side wall having an aperture therein;
   a further shaft extending through said aperture and having an end portion outside the gear-box;
   a bevel wheel carried by the further shaft within the gear-box;
   an auxiliary drive unit havng a housing detachably secured to said side wall; the auxiliary drive unit further including:
   a drive pinion removably secured to the end portion of the further shaft;
   an auxiliary hydraulic motor supported by the housing;
   a driving pinion connected to the auxiliary motor;
   an idler gear rotatably supported by the housing by means of a splined shaft and continuously in mesh with the driving pinion;
   a number of dogs carried on a side surface of the idler gear;
   a number of non-rotatable dogs carried by the inside wall of the housing in such a manner as to allow sliding movement with respect thereto;
   the arrangement being such that the idler gear is movable from a position in which it is out of meshing engagement with the driven pinion to an operative position in which it is in meshing engagement with the driven pinion and that to lock the idler gear against rotation the non-rotatable dogs are slid into engagement with the corresponding dogs on the idler gear when the idler gear is in the operative position.

7. A conveyor-chain-drive gear-box and an auxiliary drive unit as claimed in claim 6 in which there is provided a pressure sensitive locking device to lock the driving pinion against the rotation in the event of a pressure failure to the hydraulic motor.

8. A conveyor-chain-drive gear-box and an auxiliary drive unit as claimed in claim 7 in which the pressure sensitive locking device comprises a spring loaded plunger held out of engagement with the driving pinion by fluid pressure.

* * * * *